Patented Feb. 28, 1939

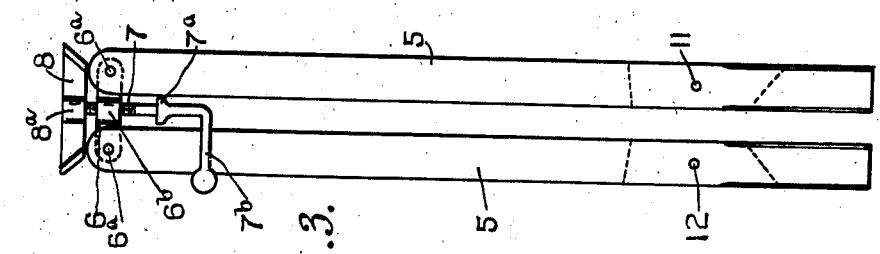
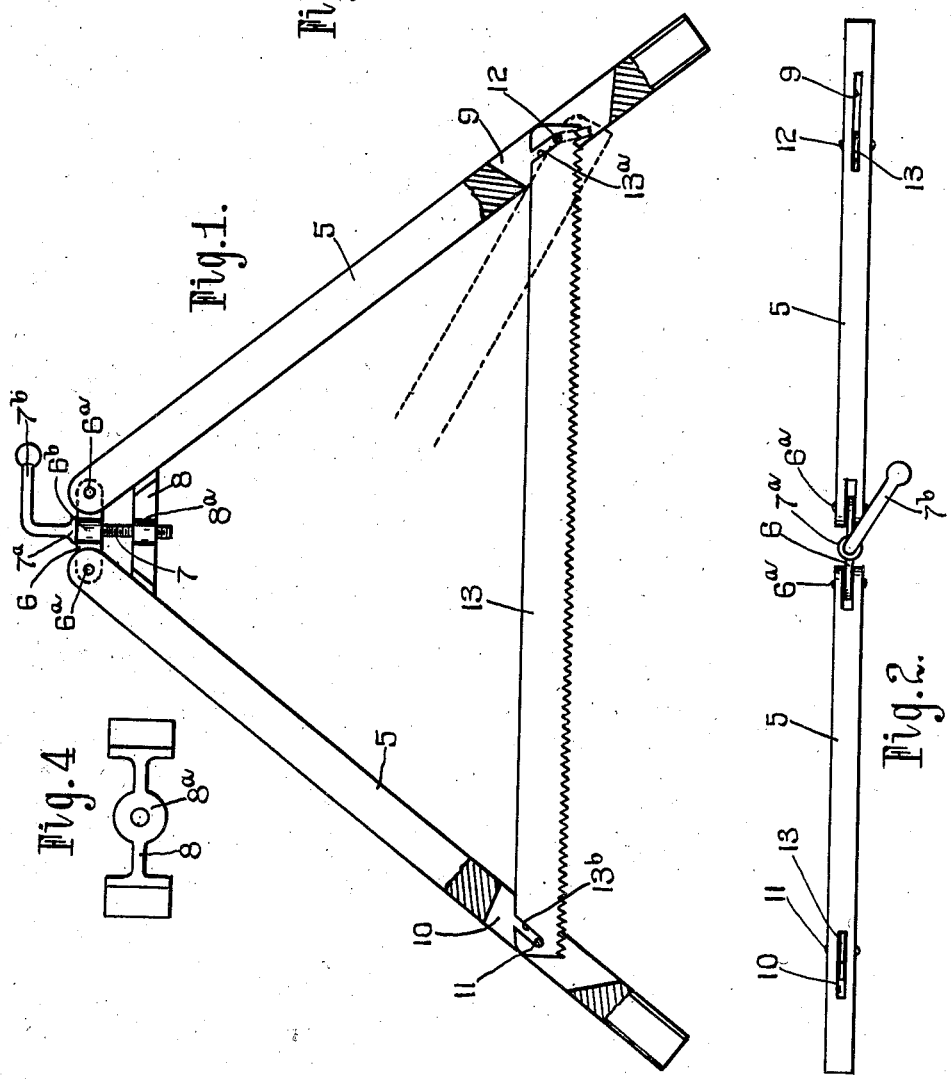

2,148,734

UNITED STATES PATENT OFFICE 2,148,734

BUCKSAW

John C. Du Jat, Reynoldsburg, Ohio

Application June 9, 1937, Serial No. 147,327

5 Claims. (Cl. 145—32)

A bucksaw of the kind ordinarily used in connection with a saw buck for sawing sticks or logs of wood, because the said bucksaw is rather large and bulky, it is difficult, troublesome and expensive to transport or store.

One object of the present invention is to provide an improved construction of bucksaw, the parts of which are simple and economically manufactured and easily and quickly assembled for use or disassembled and when unassembled compacted and placed in a small box for transportation or storage. Other objects incidental to the main object will be apparent from the disclosure of the details herein.

The invention is embodied in the example herein shown and described, the features of novelty being finally claimed.

In the accompanying drawing—

Figure 1 is a view in side elevation, with portions in section, of the assembled members of the tool according to the invention.

Fig. 2 is a top plan view.

Fig. 3 is a view in side elevation of a frame and its appurtenances, except the saw blade, collapsed.

Fig. 4 is a detail in plan view, on a larger scale, of the arm spreader.

In the views 5, 5, designate arms of the main frame and 6 a link or connecting device pivotally pinned at 6ª to said arms at one pair of their ends, said connecting device being such, in the present instance, that the arms are capable of having their angular relation to each other changed.

The said link 6 has at its middle a collar 6ᵇ perforated for the passage of a screw 7, said screw having a stop shoulder 7ª and a suitable handle 7ᵇ for turning the screw.

8 designates the device for spreading the arms, said device having its opposite ends enlarged and formed to fit against the inner edges of the arms when spread to receive the saw blade and having a central screw threaded collar 8ª to be operatingly engaged by the screw 7.

When the screw 7 is turned in the proper direction the spreader 8, by reason of the stop 7ª on the screw, is drawn upward toward the link 6 to secure the saw in its operating position.

The lower portions of the arms above the handle ends thereof are provided with transverse slots 9 and 10 to receive the opposite ends of the saw blade, said slots being conveniently made of generally dovetail form. These slots have, in the instance shown in Fig. 1, their wider ends terminating at corresponding edges of the arms; and each slot has intersecting it transversely a stout pin, as seen at 11 and 12, fixed in the arm, each of these pins being substantially correspondingly located in relation to the figure of the slot. When the said slots 9 and 10 are made, as shown in full lines, Fig. 1, the frame arm members can be completely reversed, as shown in Fig. 3. But the slots can both be made, for example, with their longer ends facing each other as suggested by broken lines in Fig. 3 and when the arms are reversed the saw may be applied but without the advantage hereinafter set forth in connection with the arrangement of the slots, as in Fig. 1.

13 designates the saw blade, it being made of good sheet steel, said blade having at each of its ends a slit or slot, as seen at 13ª and 13ᵇ that opens at the upper untoothed edge of the saw blade. The said slits converge in the upward direction and permit engagement of the saw blade with the pins 11 and 12 respectively because the spreading of the arms of the frame by the spreader tends to cause the rising of the saw blade in relation to the arms until such rising is arrested by the lower ends of the slots.

In practice with the construction as shown in Fig. 1, the right hand slit of the blade is first engaged with the pin 12 by holding one end of the blade upward, as shown in broken lines in Fig. 1, and effecting the engagement of the slit with said pin, and when this engagement is effected the free end of the blade is swung down into position to receive the wide end of the slot in the left hand arm and loosely engage the left hand slit of the blade with the pin 11 of that slot. The advantage of this particular feature of construction and arrangement of the arms is that after the engagement of the slit at the right hand end of the saw and the arm is turned down sole attention can be given to effecting engagement at the left hand end without the annoyance of loss of the first engagement because when the blade is engaged with the first pin it cannot be entirely removed from that engagement except by swinging the blade upward into the position for effecting the entire disengagement.

The arms of the frame can, if desired, be made wholly or partly of light metal or of a material or materials other than wood.

The distance of the spreader 8 from the toothed edge of the saw permits the cutting of logs of larger diameter than would be possible with the ordinary saw of similar length when mounted in a frame of different construction.

The construction, as shown and described, can be made in different sizes and affords a handy and cheap practical tool for farmers, mechanics, tourists and boy scouts. It is obvious from the illustration in Fig. 3 that the collapsed frame and its accessories together with the saw blade can be put into a narrow container of suitable length for storage or transportation.

The forms of the parts can be changed without departing from the gist of the invention as claimed.

What I claim is:

1. A bucksaw including a frame consisting of a pair of saw receiving arms of substantially similar rectilinear form, a member connecting said arms having distinct and separated means for carrying said arms at their upper ends, at least one of said means being pivotal whereby the angular relation of said arms to each other can be varied, a spreading member for said arms, means engaging said arms connecting and spreading members, means for operating the latter, said arms each having at their lower or free end portions a longitudinal slot and a pin intersecting the same, and a saw blade provided with slots opening at the untoothed edge thereof and converging toward each other from the toothed edge of said blade for engaging said pins.

2. In a bucksaw frame, a pair of saw receiving arms of substantially similar rectilinear form, a member connecting said arms having distinct and separated means for pivotally carrying each of said arms at its upper end whereby said arms can be folded into parallel relation at either side of said connecting member, a spreading member for said arms and means engaging said connecting and spreading member for operating the latter.

3. In a bucksaw frame, a pair of saw receiving arms of substantially similar rectilinear form, a member connecting said arms having distinct and separated means for pivotally carrying each of said arms at its upper end whereby said arms can be folded into parallel relation at either side of said connecting member, a spreading member for said arms and means engaging said connecting and spreading members for operating the latter, said arms each having at its lower or free end portion a longitudinal slot and a pin intersecting the same to receive an end of the saw blade.

4. In a bucksaw frame, a pair of saw receiving arms of substantially similar rectilinear form, a member connecting said arms having distinct and separated means for freely pivotally carrying each of said arms at its upper end whereby said arms can be folded into substantially parallel relation at either side of said connecting member, a spreading member for said arms, and means engaging said connecting and spreading members for operating the latter, a saw blade provided with slots opening at the untoothed edge thereof and converging toward each other from the toothed edge thereof, said frame arms each having at its lower free end portions a longitudinal slot and a pin transversely intersecting the same to receive an end of the saw blade, the slot of one of said arms having its said transversely intersecting pin positioned therein to receive a slot of the blade only when said blade is in a tilted position in relation to said arm.

5. In a bucksaw frame, a pair of arms of substantially similar rectangular form, a member containing distinct separated pivots for spacingly and pivotally connecting said arms at their upper ends whereby said connected arms can hang side by side in parallel relation to each other, a distinct and separable spreading member for said arms, and means engaging both the spreading member and the said arms connecting member for operating the spreading member.

JOHN C. DU JAT.